Nov. 8, 1966 W. B. WILSON 3,283,400
METHOD OF PRODUCING A HEAVY DUTY DOOR KNOB ASSEMBLY
Filed Oct. 28, 1963 2 Sheets-Sheet 1
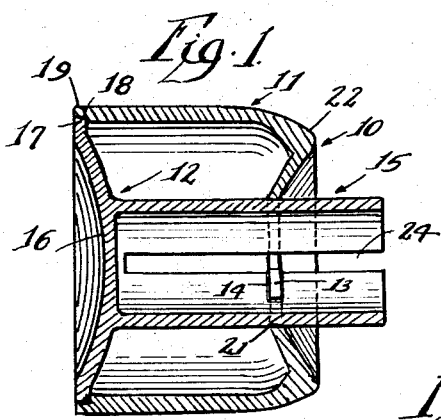
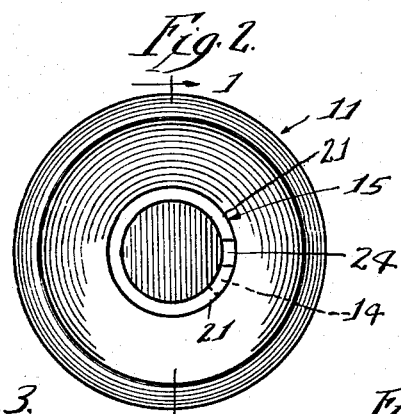
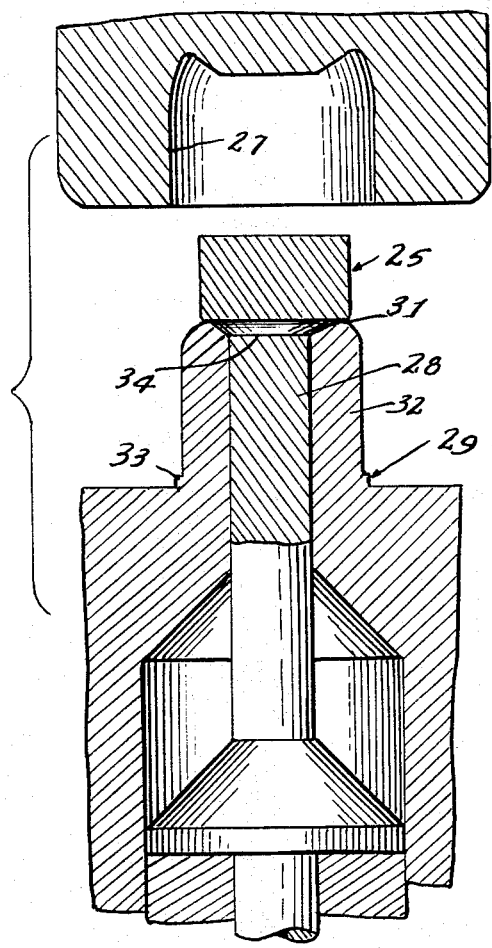
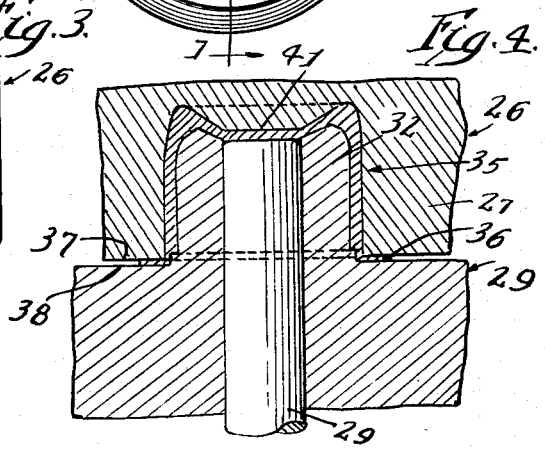
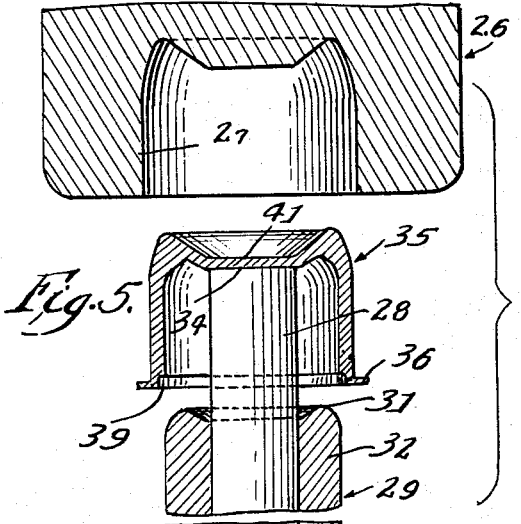
Inventor.
William B. Wilson
By Wilson & Geppert
Attorneys Nov. 8, 1966  W. B. WILSON  3,283,400
METHOD OF PRODUCING A HEAVY DUTY DOOR KNOB ASSEMBLY
Filed Oct. 28, 1963  2 Sheets-Sheet 2
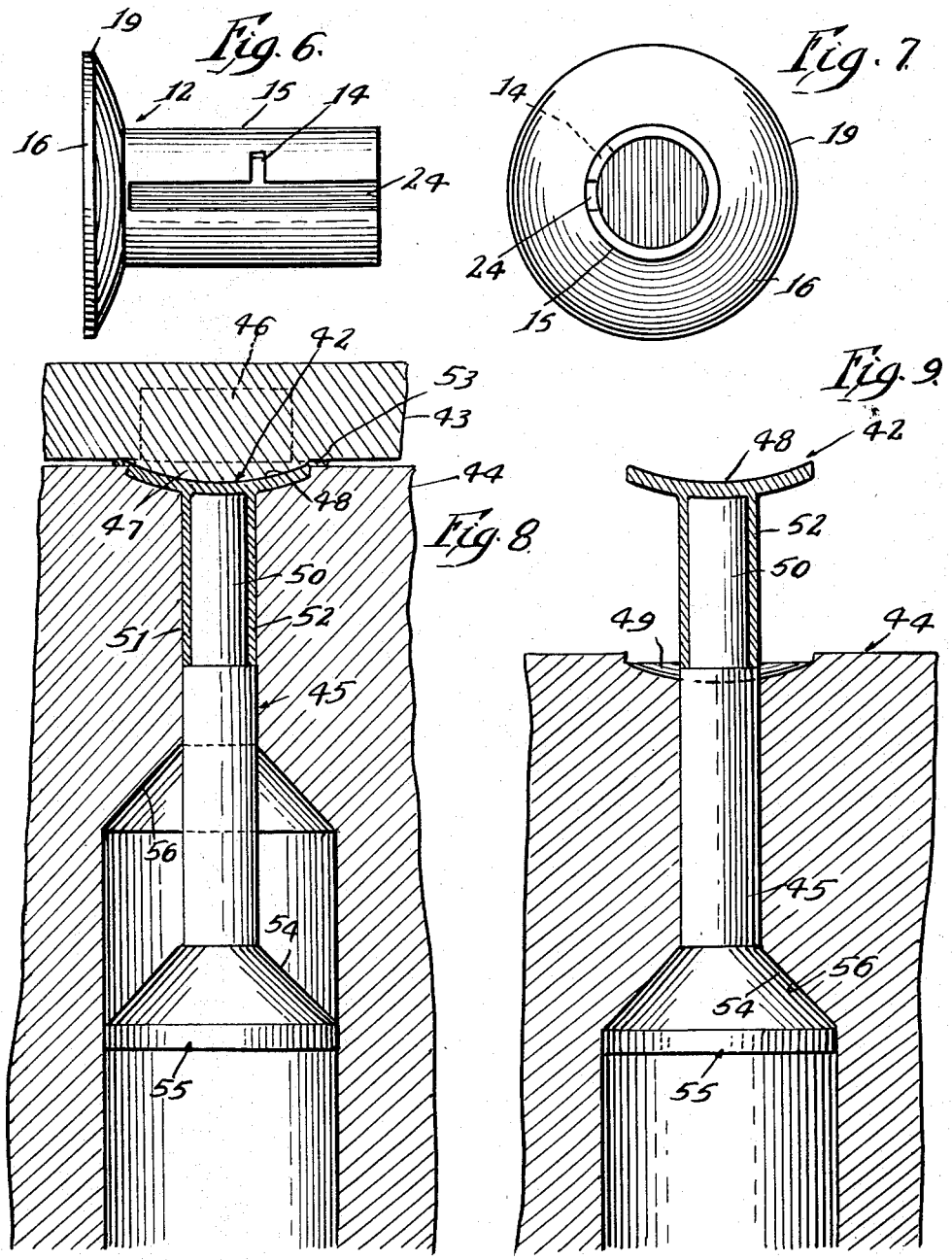
Inventor:
William B. Wilson
By Wilson & Geppert
Attorneys

United States Patent Office 3,283,400
Patented Nov. 8, 1966

3,283,400
METHOD OF PRODUCING A HEAVY DUTY DOOR KNOB ASSEMBLY
William B. Wilson, La Habra, Calif., assignor to Robert H. Miller and F. Louis Behrends, Peoria, Ill., joint tenants, with right of survivorship
Filed Oct. 28, 1963, Ser. No. 319,253
9 Claims. (Cl. 29—161)

The present invention relates to the production of a novel heavy duty knob assembly for builder's locks or lock sets in which the knob assembly consists of two parts, each extruded of a slug of brass, stainless steel or other suitable metal in a high energy metal working or extrusion press, and these parts provided with novel means for readily joining and retaining them in assembled relation, and a novel method and manner of producing these parts.

In the present manufacture of knobs, the common practice is to produce knobs of sheet metal by plural drawing and expanding operations to form the knob and its reduced neck portion, but such knobs are necessarily of relatively light metal incapable of use where a heavy duty knob is required. While such knobs may be reinforced by a separate insert such as a die casting whereby the knob may be joined to the spindle of a door lock, such production necessarily requires multiple operations to nest and securely retain the parts in assembled relation.

Heavy duty knobs most commonly employed consist of plural shells joined together in various ways to provide a nested assembly. This also requires plural stages of draws to form each of the nested shells and to conform the inner shell or shells with that of the outer shell, after which the nested shells are rolled in and assembled by frictional contact. Heavy duty knobs produced by such prior methods are necessarily expensive for they require plural operations and the resulting product lacks the rigidity and strength inherent in the present invention.

Among the objects of the present invention is the provision of a novel method of impact forming a two-part heavy duty door knob by high energy impact extrusion of a slug or billet of metal in a multi-part high energy press. Each part is extruded separately with one of these parts comprising a novel knob and the other a novel end cap and tubular part integrally formed.

Another important object and advantage of the present invention and its method of forming the two parts of the door knob assembly by high energy impact is the novel method of production in which the developed flash is discharged laterally from the major diameter facilitating removal of the resulting blanks or extrusions from the tooling and also facilitating removal of the developed flash.

Another object of the present invention is the provision of a novel method and manner of impact forming and assembling a two-part heavy duty door knob. After formation, an opening is provided in the knob to receive the tubular part integral with the end cap; the opening having a tab on the periphery. The tubular part is longitudinally slotted and has a lateral slot to receive the tab on the knob when the tubular part is inserted into the knob opening and the two parts are rotated relative to each other.

Thus the present invention comprehends the manufacture of a novel two-piece heavy duty knob assembly in which each part is formed by impact in a single operation and the novel method or manner of producing each part by high energy impact or extrusion of a slug of suitable metal by means of a high energy press.

Further objects are to provide a method of production and assembly of maximum simplicity, efficiency, economy and ease of operation, and such further objects, advantages and capabilities as will later more fully appear and are inherently possessed thereby.

In the drawings:

FIGURE 1 is a vertical cross sectional view of a novel door knob assembly and showing the manner in which the two parts are joined together, the view being taken on the line 1—1 of FIG. 2.

FIG. 2 is a view in rear elevation of the assembled door knob.

FIG. 3 is a fragmentary view on a reduced scale, part in vertical cross section and part in side elevation, of the separated components of tools to be used in high energy press for forming the hollow cupped member or knob part of the assembly from a slug of metal, the tools including an upper die, a lower die and an ejector employed in the method and manner of forming this member.

FIG. 4 is a view similar to FIG. 3 but showing the upper platen carrying the upper female die lowered to impact the metal slug and form the cupped member of the knob assembly.

FIG. 5 is a fragmentary vertical cross sectional view showing the succeeding position in the method of production in which the upper forming die has been elevated and withdrawn from the formed cup member which is subsequently removed from the dies by raising the inner member or ejector.

FIG. 6 is a view in vertical cross section of the integral end cap and its tubular projection, the view being taken on the line 6—6 of FIG. 7.

FIG. 7 is a view in end elevation of the inner end of the end cap and its integral tubular part.

FIG. 8 is a fragmentary view on a reduced scale, part in vertical cross section and part in side elevation, of the upper die, the lower die and the ejector with the dies closed upon a slug of metal for forming the integral end cap and tubular part.

FIG. 9 is a fragmentary view, part in vertical cross section and part in side elevation, disclosing the inner member or ejector elevated in the bore of the lower or outer concentric die after the upper die (not shown) has been elevated and withdrawn.

Referring to the disclosure in the drawings and to the novel illustrative embodiment therein shown, the present invention comprehends a novel heavy duty knob assembly 10 consisting of two parts each formed by high energy impacting a slug or billet of suitable metal, such as brass or stainless steel, on a high energy, extrusion press. These parts include a cupped member or knob part 11 and a combined, integrally formed end cap and tubular part 12, these two members 11 and 12 being detachably but securely joined together and retained assembled by a tab or lug 13 on the cupped member 11 adapted to be received in a transverse slot 14 in the tubular part 15 for interlocking engagement to provide the novel knob assembly or unit 10.

The end cap 16 on the outer end of the tubular part 15 may be of any desired shape with its peripheral edge 17 conformably seating upon an annular shoulder 18 formed in the peripheral edge 19 of the cupped member, and locked in this position as shown in FIG. 1 by the tab or lug 13 formed along the circular opening 21 on the internal reduced inner end 22 of the cupped member 11. This lug or projection 13 is conformably received and retained in the transverse slot 14 in the tubular part or extension 15 opening into and disposed intermediate the ends of a longitudinal slot 24 in this tubular part, the slot 24 being of a width to conformably receive and permit longitudinal movement therein of the tab or lug 13 until this tab is aligned with the transverse slot 14, whereupon relative turning movement between the cupped member 11 and the combined end cap and tubular part 12 causes this tab 13 to enter and be lodged in the slot 14 to form a rigid unitary knob assembly 10.

The present invention comprehends high energy extruding both the cupped member 11 and the integral end cap and tubular part 12 in a high energy press. In extruding the cupped member or knob part 12 as shown in FIGS. 3, 4 and 5, a slug or billet 25 of the desired metal is impacted and extruded in a high energy extrusion press having a ram 26 provided with a downwardly opening female die 27 having the external contour or shape of the intended extrusion, an ejector 28 and an encompossing male die 29 for forming the internal contour of the extrusion, the slug of metal 25 being disposed on the upper projected annular end 31 of the male die 29 when the upper and lower dies are separated preceding impact as shown in FIG. 3.

The projected or upper annular end 31 and the cylindrical part 32 of the male die 29 are suitably contoured to form the internal shape of the extrusion, the lower end of the cylindrical part having an annular shoulder or offset at 33 to form the annular notch 18 in the inner periphery of the knob part 11. The ejector 28 is of uniform diameter provided with a substantially flat upper surface 34.

The formed extrusion or blank 35 after high energy impact is shown in FIG. 4 with any kash being ejected laterally at 36 in the spacing between the co-planar surfaces 37 and 38 on the upper or female die 27 and the lower or male die 29, respectively. FIG. 5 shows the upper die 27 raised following impact after which the formed extrusion or blank 35 is lifted off of the male die 29 by elevating the ejector 28. Any flash 36 developed at the notched end 39 of the blank and which projects laterally therefrom is removed and the opening 21 is formed by removing the central portion 41 of the blank except for the inwardly projecting interlocking tab or lug 13.

The blank 42 forming the integral end cap and tubular part 12 is also extruded in a high energy press having an upper die 43 and a lower die 44 provided with an ejector 45. FIG. 8 discloses the dies closed after a slug or billet 46 of the metal (shown in dotted outline) has been placed on the lower die 44 with the upper die 43 elevated. The upper die is provided with a depending rounded or convex projection 47 forming the concaved or dished outer surface 48 of the end cap 16, and the lower die 44 is dished or provided with a concaved conforming or complementary recess 49. The ejector 45 is longitudinally reduced in diameter at 50 to provide an elongated annular space 51 between it and the inner wall of the lower encompassing die 44 for the flow thereinto of the extruded metal to form the tubular part 52 of the blank 42. Any flash developed from the high energy impact is extruded laterally at 53 into the space between the adjacent co-planar surfaces of the upper die 43 and the lower die 44 and this localized flash can be readily removed from the completed extrusion or blank 42.

In the removal of the blank 42 from the dies, the upper die 43 is first raised from the lower die 44 after which the ejector 45 is raised as shown in FIG. 9 to elevate or withdraw the blank from the annular space 51. The impacted blank 42 is then freed and readily removed from the ejector by any suitable means such as a conventional stripper or forked piece disposed under the major diameter of the blank while the ejector 45 is lowered.

Both the ejectors 28 and 45 are longitudinally movable relative to the outer punch or die 29 and 44, respectively, a distance permitted by the spacing between the inclined surface 54 on the enlargement 55 on the ejector 28 or 45 and the complementray inclined surface 56 of the concentric lower die 29 or 44, respectively. This distance is sufficient to remove the formed blank or extrusion 35 or 42 from the lower die by elevating the ejector.

The blank 42 forming the integral end cap and tubular part 12 is then longitudinally slotted at 24 and provided with a transverse slot 14 whereby the knob part 11 and the integral end cap and tubular part 12 may be readily assembled as disclosed in FIGS. 1 and 2. This is accomplished and the parts securely interlocked by projecting the free end of the tubular part 15 through the opening 21 in the inner reduced end 22 of the knob part 11 with its tab or lug 13 aligned and slidably disposed in the longitudinal slot 24 of the tubular part 15. When the outer peripheral edge 17 of the end cap 16 is seated in the annular notch 18 in the outer peripheral edge 19 of the knob part 11, the tab or lug 13 is aligned with the transverse slot 14 in the tubular part 15 whereby relative rotation between the parts 11 and 12 causes this tab 13 to enter the conforming slot 14 and lock the parts together to form the knob assembly or unit 10.

In the forming of the two parts or sections of the present knob assembly, the flash developed during high energy impact flows laterally or at a right angle to the ejector which facilitates its removal. Furthermore, localizing the flash in the manner shown at the major diameter allows ready access of any type of automatic stripper under the major diameter to remove the extruded piece from the tooling after it has been formed.

Although the drawings disclose the female die on the upper platen, the parts may be reversed so that this die is disposed on the lower platen in which case the slug or billet of metal may be disposed or centered in this female die, or the dies may be arranged and moved horizontally.

While it is preferable that the longitudinal and transverse slots 24 and 14 be milled in the tubular part 15, it is not intended to exclude forming the longitudinal slot 24 in the press during high energy impact. This longitudinal slot not only receives and guides the tab 13 into registry with the transverse slot 14 for interlocking engagement between the knob part 11 and the combined end cap and tubular part 12, but also provides for a key lock assembly and whatever other side operations are required for mounting the resulting knob assembly to the projected end of a tubular cam member or spindle of a door lock assembly.

The end cap 16 is shown imperforate and the knob devoid of any locking means (FIG. 1) such as for use with a passage door. However, when the knob is intended to receive a cylinder lock, key, push or turn button, this end cap or face 16 is provided with an opening conformably receiving and mounting the cylinder or button.

Having thus disclosed the invention, I claim:

1. The method of forming a heavy duty knob of two parts one of which consists of a cup-shaped, one-piece knob part having an opening at its outer end, a cylindrical body and a reduced opening at its inner end, the other part consisting of an end cap providing a closure for the open outer end of said knob part and an integral inwardly extending tubular part projecting through said knob part, comprising the steps of forming each part by high energy impact on a heavy duty press between a female die and a male die and an ejector telescopically arranged in said male die, said dies for forming said knob part when separated receiving a slug of metal therebetween, high energy impacting the metal and extruding the metal between said dies to form a cup-shaped knob part having an enlarged open end, a cylindrical body with a reduced closed end, high energy impacting another slug of metal between a female die and a male die and an ejector telescopically arranged and extruding the metal between said dies to form an end cap for the knob and an integral tubular extension, providing an opening in the reduced closed end of the cup-shaped knob part, and assembling the two parts with the end cap providing a closure for the opening in the outer end of the knob part and the tubular extension projecting through the opening formed in the reduced closed end.

2. The method of forming a heavy duty knob as set forth in claim 1, including the steps of providing the opening in the base of the cup-shaped knob part with a tab and the tubular extension with a slot to receive the tab and interlock the two parts in rigid assembly.

3. The method of forming a heavy duty knob as set forth in claim 2, in which the tubular extension is provided with a longitudinal slot and intermediate the length of said slot with a transverse slot to receive the tab for interlocking assembly.

4. The method of forming a heavy duty knob as set forth in claim 2, in which the open outer end of the knob part is provided with an annular notch to receive and seat the end cap of the other part of said knob.

5. The method of forming a two-part heavy duty knob by forming each part by impact in a high energy press having a female die, a male die and an ejector, said male die for one part being provided with an annular projection, comprising the steps of placing a slug of suitable metal between the dies, high energy impacting said slug of metal to form a knob part of cup shape having an open enlarged end forming the outer end of the knob and a closed end of reduced diameter, ejecting the knob part, and forming a centrally positioned opening in said reduced end for passage therethrough of a tubular part.

6. The method of forming a two-part heavy duty knob as set forth in claim 5, in which said annular projection is provided with an annular shoulder at its lower end, the annular shoulder simultaneously forming an annular notch in the open enlarged end of the blank as the blank is formed into the knob part, and the cavities of the male and female dies are so arranged and spaced that flash resulting from the extrusion is discharged radially from the periphery of the open enlarged end of the extruded blank.

7. The method of forming a two-part heavy duty knob as set forth in claim 5, in which said second part is formed in a press having a female die, a male die, and an ejector, providing said dies with spaced conforming surfaces between said male die and said ejector to form an annular space for the flow of extruded metal thereinto to form a tubular extension projecting from and integral with an end cap, and impacting a slug of metal between said dies to form the end cap and integral tubular extension.

8. The method of forming a two-part heavy duty knob as set forth in claim 7, in which the female die for the second part is provided with a rounded projection and the male die with a complementary dished recess, and said dies are spaced apart at said dished recess and projection whereby flash is extruded laterally of the circumferential edge of said dished recess for ready removal.

9. A method of forming a two-part heavy duty knob as set forth in claim 7, in which said second part is removed from the dies, its tubular extension is longitudinally slotted, and the two parts are assembled with the end cap closing the enlarged open end of the knob and received in the annular notch thereon and the tubular extension extending through the opening in the other end of the knob.

References Cited by the Examiner
UNITED STATES PATENTS

| | | | |
|---|---|---|---|
| 447,265 | 2/1891 | Wilmot et al. | 29—161 |
| 1,407,960 | 2/1922 | Swick et al. | 29—161 |
| 2,273,190 | 2/1942 | Harrison | 29—161 |
| 2,344,803 | 3/1944 | Criley | 72—254 |
| 2,701,161 | 2/1955 | Cain | 292—347 |
| 2,793,899 | 5/1957 | Meyer | 292—347 |
| 2,874,460 | 2/1959 | Riethmuller et al. | 72—254 |
| 3,012,808 | 12/1961 | Zion | 292—347 |
| 3,170,235 | 2/1965 | Williams | 72—254 |
| 3,200,630 | 6/1965 | Wilson | 72—254 |

JOHN F. CAMPBELL, *Primary Examiner.*

DONLEY J. STOCKING, *Examiner.*

THOMAS H. EAGER, *Assistant Examiner.*